3,037,839
PREPARATION OF UO₂ FOR NUCLEAR REACTOR FUEL PELLETS
John M. Googin, Oak Ridge, Tenn., assignor to the United States of America as represented by the United States Atomic Energy Commission
No Drawing. Filed Sept. 30, 1960, Ser. No. 60,280
6 Claims. (Cl. 23—14.5)

My invention relates to a method of preparing $UO_2$ and more particularly to a method of preparing $UO_2$ suitable for use in a nuclear reactor.

Because of its desirable physical, chemical and nuclear properties $UO_2$ is useful as fuel material in nuclear reactors. One type of reactor utilizing $UO_2$ is the gas-cooled power reactor, specific embodiments of which are described in detail in the report TID–7564, "Information Meeting on Gas-Cooled Power Reactors, Oak Ridge National Laboratory, October 21–22, 1958," issued December 1958. In this type reactor $UO_2$ is employed in the form of small pellets, e.g., tubular pellets with a 0.750 inch outer diameter, 0.375 inch inner diameter and one-half inch length, which are stacked and encased in metal capsules. The $UO_2$ pellets are required to have a high density, i.e., 95 percent of theoretical, and to meet close dimensional tolerances. Fabrication of $UO_2$ to meet these requirements is effected by means of compressing $UO_2$ powder into unsintered or "green" shapes of the desired size and sintering to form the dense pellets.

$UO_2$ powder prepared by the methods previously employed, e.g., the method described in my U.S. Patent 2,906,598, issued September 29, 1959, has presented difficulties in fuel pellet fabrication, resulting in excessive fabrication costs. This powder does not form cohesive pellets; consequently, addition of a binder such as stearic acid is required. The use of a binder presents disadvantages in that contamination is introduced into the product and additional handling is required in blending the binder with the $UO_2$. Extremely high pressures, e.g., 50 to 70 tons per square inch, have been required to obtain suitable compaction with this powder. These high pressures result in additional costs because of the expensive equipment needed, particularly high pressure dies which are rapidly worn under these conditions. Another difficulty with the previously employed $UO_2$ has been the tendency of the $UO_2$ to sinter in a non-uniform manner, causing surface roughness in the sintered pellets. A tedious final mechanical treatment comprising grinding or machining has been required in order to meet dimensional tolerances. It may be readily seen that the cost of fuel pellet fabrication would be lowered substantially by the provision of $UO_2$ having the characteristics of compacting at low pressures and of sintering uniformly to form a smooth, high-density product.

It is, therefore, an object of my invention to provide a method of preparing $UO_2$ which may be readily fabricated to form high-density pellets.

Another object is to provide a method of preparing $UO_2$ suitable for compressing into cohesive shapes at low pressures without the use of a binder.

Another object is to provide a method of preparing $UO_2$ which sinters rapidly and uniformly at elevated temperatures.

Another object is to provide a method of preparing $UO_2$ which, upon being pressed into pellets, may be sintered to specified final dimensions without machining or grinding.

Other objects and advantages of my invention will be apparent from the following detailed description and claims appended hereto.

In accordance with my invention, $UO_2$ suitable for fabrication into high-density fuel pellets is prepared by contacting an aqueous solution containing uranium ions and fluoride ions with an aqueous ammonium hydroxide solution at an ammonium-to-uranium molar ratio of at least approximately 26 to 1 under conditions of thorough agitation whereby a precipitate is formed, separating the precipitate from the remaining mother liquor, contacting the resulting separated solids with steam at a uniform temperature within the range of 400° C. to 650° C. until said solids are converted to $U_3O_8$ and contacting the $U_3O_8$ with hydrogen at a uniform temperature within the range of 550° C. to 600° C. until conversion to $UO_2$ is substantially completed. The $UO_2$ thus obtained may be compacted into cohesive shapes at relatively low pressures without the use of a binder. The compacted shapes sinter readily with uniform shrinkage to specified final product size, forming smooth-surfaced, high-density fuel material which does not require further mechanical processing. These improved characteristics substantially reduce the cost of fuel fabrication.

Although my invention is not to be understood as limited to a particular theory, it is postulated that the characteristic of readily forming cohesive shapes results from the conditions employed in the precipitation step and that the desired $UO_2$ sintering properties are obtained by avoidance of temperatures over 650° C. in the pyrolysis and reduction steps and by maintaining a constant temperature in these steps.

Precipitation is effected by contacting a solution containing uranyl ions and fluoride ions with an aqueous ammonium hydroxide solution. In order to obtain the desired precipitate properties, a uranium concentration of at least approximately 5 percent of saturation is required, and approximately 16 percent is preferred. The uranium is preferably in the form of a solution of uranyl fluoride, which may be prepared by reacting $UF_6$ with water. The uranium may alternately be in the form of a uranyl nitrate solution, in which case fluoride ions must be supplied, preferably by adding HF to the uranium feed solution. An amount of fluoride at least equivalent to the stoichiometric amount present in the compound uranyl fluoride is required, and an excess is preferred. The concentration of the ammonium hydroxide solution may be adjusted to provide the desired ammonium-to-uranium ratio. A ratio of at least 25 to 1 is required to obtain the desired $UO_2$ properties, and at ratios over 30 to 1 separation from the mother liquor becomes difficult. A ratio of approximately 26 to 1 is preferred.

The precipitation reaction may be conducted by means of either batch or continuous techniques, with continuous precipitation being preferred for large-scale operation. Thorough mixing of the reagents is required in order to prevent formation of undesirably large particles. Conventional mechanical agitators may be employed for this purpose. In continuous precipitation it is preferred to employ a jet-impingement type contactor in order to obtain further initial mixing of the reagent streams. In batch precipitation the uranium-bearing solution is added to the ammonium hydroxide solution. The reverse order of addition may result in an unsuitable precipitate because of the initial presence of high concentrations of uranium as compared to ammonium. Although not critical, it is preferred to allow the precipitate slurry to age for approximately 30 minutes prior to separation in order to minimize the loss of uranium to the mother liquor. Although the temperature employed in the precipitation step is not critical, a temperature of approximately 25° C. is preferred. At higher temperatures the precipitate particle size tends to increase. The precipitate obtained under these conditions is gelatinous and extremely fine in particle size.

The precipitate may be separated from the mother liquor by any conventional means such as filtration or centrifugation, with vacuum filtration being preferred. Although not critical, it is preferred to reslurry the separated precipitate with water to obtain higher purity, particularly with respect to fluoride content. The precipitate is then separated as before.

The separated precipitate is then converted to $U_3O_8$ by pyrolysis with steam at a constant temperature within the range of 400° C. to 650° C. In order to provide easier handling, it is preferred to partially dry the separated precipitate before pyrolysis by contacting the precipitate with air or by heating in an oven. For convenient handling, drying to a water content of 20 to 25 percent may be employed. The precipitate is then contacted with steam to form $U_3O_8$. In order to obtain $UO_2$ with the desired sintering properties, this reaction must be conducted at a temperature below 650° C. and at a uniform temperature. Temperature variations in this step result in non-uniform sintering characteristics in the $UO_2$. A temperature of at least 400° C. is required to obtain substantially complete conversion to $U_3O_8$. In order to maintain a uniform temperature, continuous equipment such as a kiln-type reactor or a fluidized bed reactor is preferred.

The $U_3O_8$ is then reduced to $UO_2$ with hydrogen. This reaction is also conducted at a uniform temperature in order to obtain uniformity in sintering. A temperature of at least approximately 550° C. is required for complete conversion to $UO_2$ and at temperatures over 600° C. sintering tends to occur. Any temperature within this range may be employed, and a temperature of approximately 575° C. is preferred. Although not critical, it is preferred to dilute the reactant hydrogen gas with an inert gas such as nitrogen in order to avoid localized hot spots. It is also preferred to conduct this reaction in continuous equipment in order to maintain temperature uniformity. Examples of suitable equipment are rotating kilns, screw-type reactors and fluidized bed reactors.

The $UO_2$ prepared under these conditions is pyrophoric owing to its high surface area and low oxygen-to-uranium ratio, i.e., approximately 2.04. In order to allow convenient handling in subsequent processing, it is preferred to slightly reoxidize the $UO_2$ to an oxygen-to-uranium ratio of approximately 2.08 to 2.12. This may be effected by contacting the $UO_2$ with a stream of cold air until the desired ratio is obtained. The pyrophoric $UO_2$ may alternately be handled in an inert atmosphere in subsequent processing.

The product oxide thus obtained is dark green in color and has a surface area of 5 to 8 square meters per gram.

The product oxide may be fabricated into fuel pellets by compressing into the desired shape and sintering. In order to provide easier handling of the $UO_2$ in the preparation of pellets, it is preferred to initially compress the $UO_2$ into solid pellets of any convenient size up to several inches in diameter and grind these pellets to form a powder greater than 30 mesh in size. The powder is then compressed a second time into the desired shape. This treatment serves to reduce the amount of fine material which would otherwise clog the equipment employed in pellet formation. Any convenient pressure such as 15,000 pounds per square inch may be employed in the initial pellet formation. The pressure required in preparing pelleted shapes for sintering varies with the pellet geometry and die design employed. In general a pressure of at least 5,000 p.s.i. is required, and a pressure of approximately 8,500 p.s.i. is preferred for the preparation of the tubular pellets described above. It is to be understood that the initial pelleting and grinding steps are not critical to my invention and that the $UO_2$ may be compressed into the shape desired for sintering without this treatment. Conventional pellet-forming machinery may be employed in these operations. The pelleted $UO_2$ shrinks approximately 40 percent upon sintering; accordingly, the pellets are prepared this much larger than the desired final size. The exact shrinkage, which will depend upon the temperatures employed in the preceding steps, may be measured and the pellet size adjusted accordingly.

Sintering is effected by heating the compressed pellets to a temperature over 1500° C., with 1800° C. being preferred. An atmosphere of hydrogen gas is preferred for sintering in order to avoid oxidation. Although sintering is largely effected in approximately 30 minutes under these conditions, it is preferred to employ a longer period such as 5 hours to ensure complete sintering throughout the pellets.

The sintered pellets prepared by this procedure have a high density, i.e., over 95 percent and meet dimensional tolerances of ±0.003 inch per inch.

My invention is further illustrated by the following specific example.

*Example*

$UO_2$ pellets were prepared from a $UO_2F_2$ solution by means of the following procedure: A uranium feed solution comprising 148 kilograms of uranium in the form of uranyl fluoride at a concentration of 85 grams per liter was added to 1,435 liters of a 58 percent aqueous ammonium hydroxide solution in a batch precipitation operation, the resulting mixture being mixed rapidly by means of a conventional rotary agitator. After 30 minutes' agitation, the precipitate thus obtained was separated from the mother liquor by vacuum filtration; and the filter cake was reslurried in water and refiltered. The cake obtained in the second filtration was contacted with air at 150° C. for 12 hours to remove the bulk of the moisture. The dried filter cake was then contacted with steam at a uniform temperature of 425° C. to produce $U_3O_8$. In this step the filter cake was fed into a continuous kiln-type reactor at a rate of 2 kilograms per hour, the powder residence time in the reactor being 3 hours. Steam was fed to the reactor at a rate of 3 pounds per hour. The $U_3O_8$ thus obtained was reduced with hydrogen at a uniform temperature of 575° C. in a second continuous, kiln-type reactor. Reduction was effected by continuously introducing the $U_3O_8$ at a rate of 2 kilograms per hour and a 50:50 mixture of gaseous hydrogen and nitrogen at a rate of 1 cubic foot per minute. The residence time of the powder in the reactor was 1½ hours. The resulting $UO_2$ was then allowed to cool and contacted with a stream of air at room temperature in a water-cooled screw reactor to produce an oxygen-to-uranium ratio of 2.13 by reoxidation. The reoxidized $UO_2$ was pressed into solid pellets at a pressure of 15,000 pounds per square inch and the pellets were ground to 35 mesh size particles. These particles were then compressed at 8,500 p.s.i. into fuel element shapes 40 percent larger than specified final dimensions. The pellets were then sintered for 5 hours at 1800° C. in a hydrogen atmosphere. The sintered pellets had a density of at least 10.6 (over 95 percent of theoretical) and met dimensional tolerance of ±0.003 inch per inch at the final size of 0.075 inch outer diameter, 0.375 inch inner diameter and 0.5 inch length.

It may be seen from the above example that high-density fuel pellets may be readily fabricated from the $UO_2$ powder prepared by the method of my invention.

The above example is not to be construed as limiting in any way the scope of my invention, which is limited only as indicated by the appended claims. It is also to be understood that numerous variations in apparatus and procedure may be employed by one skilled in the art without departing from the scope of my invention.

Having thus described my invention, I claim:

1. The method of preparing high-density $UO_2$ shapes which comprises continuously contacting an aqueous uranyl fluoride solution with an aqueous ammonium hydroxide solution under conditions of thorough agitation at an ammonium-to-uranium ratio within the range from 25-to-1 to 30-to-1, separating the resulting precipitate from the remaining mother liquor, drying the resulting separated precipitate, contacting the resulting dried precipitate with steam at a uniform temperature within the range of 400° C. to 650° C. until said precipitate is converted to $U_3O_8$, contacting sad $U_3O_8$ with gaseous hydrogen at a uniform temperature within the range of 550° C. to 600° C. until said $U_3O_8$ is converted to $UO_2$, compressing said $UO_2$ into discrete shapes at a pressure of at least 5,000 pounds per square inch and sintering the resulting shapes in a reducing atmosphere at a temperature over 1500° C.

2. The method of claim 1 wherein said $UO_2$ is oxidized to the extent of an oxygen-to-uranium ratio from approximately 2.08 to 2.12 prior to being compressed.

3. The method of claim 1 wherein said $U_3O_8$ is contacted with gaseous hydrogen at a temperature of approximately 575° C.

4. The method of preparing high-density sintered $UO_2$ shapes which comprises adding an aqueous uranyl fluoride solution to an aqueous ammonium hydroxide solution under conditions of thorough agitation until an ammonium-to-uranium ratio within the range from 25-to-1 to 30-to-1 is obtained, separating the resulting precipitate from the remaining mother liquor, drying the resulting separated precipitate, contacting the resulting dried precipitate with steam at a uniform temperature within the range of 400° C. to 650° C. until said precipitate is converted to $U_3O_8$, contacting said $U_3O_8$ with gaseous hydrogen at a uniform temperature within the range of 550° C. to 600° C. until said $U_3O_8$ is converted to $UO_2$, compressing said $UO_2$ into discrete shapes at a pressure of at least 5,000 pounds per square inch, and sintering said shapes in a reducing atmosphere at a temperature of at least 1500° C.

5. The method of claim 4 wherein said $UO_2$ is oxidized to the extent of an oxygen-to-uranium ratio from approximately 2.08 to 2.12 prior to being compressed.

6. The method of claim 4 wherein said $U_3O_8$ is contacted with gaseous hydrogen at a temperature of approximately 575° C.

References Cited in the file of this patent

UNITED STATES PATENTS

| | | |
|---|---|---|
| 2,906,598 | Googin | Sept. 29, 1959 |
| 2,953,430 | Leaders et al. | Sept. 20, 1960 |

FOREIGN PATENTS

| | | |
|---|---|---|
| 801,381 | Great Britain | Sept. 10, 1958 |

OTHER REFERENCES

Hausner et al.: "Nucleonics," July, 1957, vol. 15, pp. 94–97, 99–101.

TID–7546, Book 2, Nov. 23, 1957, pp. 374, 386, 387, 390, 391, 394, 395, 398.

2nd Geneva Conference on Peaceful Uses of Atomic Energy, vol 6, pp. 569–575, 591, 612, 620 (1958).